United States Patent
Bae et al.

(10) Patent No.: US 8,165,165 B2
(45) Date of Patent: Apr. 24, 2012

(54) APPARATUS FOR DYNAMIC HEADER COMPRESSION AND METHOD THEREOF

(75) Inventors: Hyung-Deug Bae, Daejon (KR); Nam-Hoon Park, Daejon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 165 days.

(21) Appl. No.: 12/414,211

(22) Filed: Mar. 30, 2009

(65) Prior Publication Data

US 2009/0190612 A1 Jul. 30, 2009

(30) Foreign Application Priority Data

Sep. 29, 2006 (KR) .................. 10-2006-0095568

(51) Int. Cl.
*H04J 3/18* (2006.01)
(52) U.S. Cl. ........ 370/477; 370/252; 370/349; 370/389; 370/392; 370/471; 370/474; 455/72; 709/247
(58) Field of Classification Search .......... 370/252, 370/349, 389, 392, 471, 474, 477; 709/247; 455/72
See application file for complete search history.

(56) References Cited

U.S. PATENT DOCUMENTS

| | | | |
|---|---|---|---|
| 7,564,381 B1 * | 7/2009 | Asawa et al. ............ | 341/106 |
| 2002/0067721 A1 * | 6/2002 | Kye ..................... | 370/389 |
| 2002/0071432 A1 * | 6/2002 | Soderberg et al. ....... | 370/389 |
| 2002/0136291 A1 * | 9/2002 | Sala et al. ............. | 375/240 |
| 2003/0058889 A1 * | 3/2003 | Lansing et al. ......... | 370/471 |
| 2005/0030944 A1 | 2/2005 | Lazarus et al. | |
| 2005/0037767 A1 | 2/2005 | Kim et al. | |
| 2005/0068899 A1 | 3/2005 | Murphy et al. | |
| 2006/0083270 A1 | 4/2006 | Lee et al. | |
| 2006/0104278 A1 | 5/2006 | Chang et al. | |
| 2010/0278196 A1 * | 11/2010 | Kapoor et al. ........... | 370/477 |

FOREIGN PATENT DOCUMENTS

| KR | 10-2006-0054662 | 5/2006 |
|---|---|---|
| WO | 2005/015881 A2 | 2/2005 |

OTHER PUBLICATIONS

Fitzek et al., Header Compression Schmes for Wireless Internet Access, Jul. 30, 2003.*
International Search Report for PCT/KR2007/004536, mailed Jan. 2, 2008.

* cited by examiner

*Primary Examiner* — Hoon J Chung
(74) *Attorney, Agent, or Firm* — Staas & Halsey LLP

(57) ABSTRACT

Provided are an apparatus for a dynamic header compression and a method thereof. The method for a dynamic header compression includes: receiving a received packet having a header from an upper layer; comparing header information of the received packet with header information of a previous packet; when a suppression part of the received packet is the same as a suppression part of the previous packet, compressing the received packet based on a predetermined header suppression rule; and when the suppression part of the received packet is not the same as the suppression part of the previous packet, transmitting the received packet without compression.

10 Claims, 8 Drawing Sheets

APPARATUS FOR DYNAMIC HEADER COMPRESSION AND METHOD THEREOF

CROSS REFERENCE TO RELATED APPLICATIONS

This application is a continuation of International Application No. PCT/KR2007/004536, filed Sep. 19, 2007, which claims priority to Korean Application No. 10-2006-0095568, filed Sep. 29, 2006, the contents of both of which are incorporated herein by reference in their entirety.

TECHNICAL FIELD

The present invention relates to an apparatus for a dynamic header compression and a method thereof; more particularly, to a dynamic header compression apparatus which compresses a header of packet in a wireless communication system and a method thereof. Particularly, the present invention relates to a packet header suppression rule which suppresses and restores a header of a packet transmitted between a terminal and a base station in an IEEE 802.16 packet-based wideband mobile communication system.

This work was supported by the Information Technology (IT) research and development program of the Korean Ministry of Information and Communication (MIC) and the Korean Institute for Information Technology Advancement (IITA) [2006-S-012-01, "Development of Middleware Platform Technology based on the SDR Mobile Station"].

BACKGROUND ART

A payload header suppression (PHS) method is defined in IEEE 802.16 standard. In the PHS method, a header is divided into a suppression part and a non-suppression part. First, a transmitter sends the non-suppression part by eliminating the suppression part of the header into a receiver. Then, the receiver restores the eliminated suppression part of the header and forms the entire header. Thus, a predetermined header suppression rule is exchanged between the transmitter and the receiver at call setup step.

FIG. 1 illustrates a protocol structure of wireless telecommunication network providing a packet service based on Internet Protocol (IP) in a general IEEE 802.16 system. Referring to FIG. 1, the protocol structure will be described from an upper layer to a lower layer.

A data flows from a multimedia applications layer 113 into lower layers. The data is transmitted into a real-time transport protocol (RTP) layer 110, a hypertext transport protocol (HTTP) layer 111, and a file transport protocol (FTP) layer 112 based on a kind of the multimedia applications layer. Herein, the multimedia applications layer is considered as a web browser in present invention. However, the present invention will be applied similarly to other multimedia applications layer.

The data from the web browser is transmitted into the HTTP layer 111 and transformed into a data having an HTTP format in the HTTP layer 111. Then, the data having the HTTP format is transmitted into a transmission control protocol (TCP) layer 109.

The TCP layer 109 adds a TCP header to the received data and transmits the TCP header added data into an Internet protocol (IP) layer 107. The IP layer 107 adds an IP header to the received data and transmits the IP header added data into a convergence sublayer—service access point (CS-SAP) 106.

The CS-SAP 106 transmits the received data into a convergence sublayer (CS) 105. In the CS 105, a packet classifier 104 classifies the received packet based on a predetermined classification condition. The predetermined classification condition includes an IP address of the transmitter, an IP address of the receiver and a TCP port. The above values are defined in the IP header and the TCP header. Therefore, the packet classifier 104 extracts the above values from the header of the received packet.

After the classification of the received packet is completed, the packet classifier 104 examines whether a header suppression rule of the received packet is set up or not, and transmits the received packet into a header compressor 103.

The header compressor 103 compresses the header of the received packet based on the predetermined header suppression rule. When the header suppression rule is not set up, the header compressor 103 does not compress the header of the received packet.

After the header compression of the received packet is completed, the CS 105 maps the compressed packet based on a predetermined flow determined at the call setup step, adds a connection identifier (CID) and transmits the CID added packet into a media access control (MAC) sublayer 101 through a media access control—service access point (MAC-SAP) 102.

In the protocol structure, data receiving and data processing are performed in the receiver to the contrary of data transmitting and data processing in the transmitter.

Referring to FIGS. 2 to 3, a packet transmitting and a packet receiving based on the PHS method in the IEEE 802.16 system will be described.

FIG. 2 is a flowchart illustrating a header suppression procedure of a transmitter in the general IEEE 802.16 system.

First, a packet is received from an upper layer at step S201. The transmitter classifies the packet at step S202. Then, five parameters for suppressing the header of the classified packet is extracted at step S203. Herein, the five parameters are designated as a packet header suppression rule.

1. PHS field (PHSF)
2. PHS index (PHSI)
3. PHS mask (PHSM)
4. PHS size (PHSS)
5. PHS verify (PHSV)

The packet header suppression rule is predetermined between a base station and a terminal at call setup step.

The transmitter determines whether a packet verification is performed or not by checking the PHSV at step S204. When a value of the PHSV is '1', the transmitter determines that the packet verification should be performed.

In step S204, if the packet verification is determined, step S205 is performed. If the packet verification is not determined, step S207 is performed.

At step S205, the transmitter verifies the packet based on the PHSF and the PHSM.

When the packet verification is performed successfully, step S207 is performed. When the packet verification is failed, step S208 is performed.

Subsequently, at step S207, the transmitter compresses the verified packet by eliminating bytes based on the PHSM and sets the PHSI of the verified packet as '1'.

However, the transmitter does not compress the verification failed packet and sets the PHSI of the verification failed packet as '0' at step S208.

A value of the PHSI determined at step S207 or S208 is added into the received packet at step S209 and the PHSI added packet is transmitted into the MAC layer 101 through the MAC-SAP 102 at step S210.

FIG. 3 is a flowchart illustrating a header restoration procedure of a receiver in the general IEEE 802.16 system.

The receiver receives a packet from a lower layer through the MAC-SAP 102, reconstructs the received packet based on the packet header suppression rule and transmits the reconstructed packet into the upper layer CS 105.

When the packet is received from the MAC layer 101 throughout the MAC-SAP 102 at step S301, the CS 105 extracts the PHSI added in received packet and acquires the CID of the received packet at step S302.

Subsequently, the receiver acquires the PHSF, PHSM, PHSS and PHSV of the received packet at step S303 and reconstructs eliminated header based on the five values of the packet header suppression rule at step S304.

The reconstructed packet is transmitted into the upper IP layer 107 through the CS-SAP 106 at step S305.

FIG. 4 is a diagram illustrating header elimination and restoration procedure based on a header suppression technique in the IEEE 802.16 system.

As shown in FIG. 4, the transmitter eliminates a header 411 of a transmission packet 401 based on values of the PHSM 402. For example, if a value of the PSHM is set up as '1', corresponding bytes of the transmission packet 401 are eliminated. That is, the transmitter determines that which parts of the header are eliminated based on the value of the PHSM.

The remnant header i.e., actual transmitting header 408 includes bytes which is not set up as '1' in the PHSM 402. Therefore, transmitting packet 404 is simplified in an actual wireless channel.

In the wireless channel, the receiver receives the transmitting packet 404 and restores the packet based on the PHSM used for compressing in the transmitter. The receiver decides that a part is set up as '1' in the PHSM 405 as a restoration part. After determining the restoration part, the receiver restores the header 412 perfectly by combining a PHSF 406 and the received suppressed header, i.e., the actual transmitting header 408. The receiver transmits the resorted packet 407 into the upper layer.

Herein, a header may be partially eliminated or not. When the header is not eliminated, PHSI is set up as '0' in CS 105 and added to the transmission header, and PHSI added packet is transmitted into the MAC layer 101. However, when the header is eliminated, PHSI is set up as not '0' and added to the suppressed header, and PHSI added packet is transmitted into the MAC layer 101.

FIG. 5 is a diagram illustrating an overhead of header information in an IPv4 communication system.

A general method for generating the packet header suppression rule will be described referring to FIG. 5.

As shown in FIG. 5, header information includes IP header information for supporting the IPv4, UDP header information for supporting the UDP and RTP header information for supporting the RTP.

In FIG. 5, parameters of the header information are classified into fields varying in every packet 504 and 505, fields not varying in every packet 501 and fields occasionally varying after call setup 502 and 503. Here, since the fields of the header information have no connection with the present invention, detailed description of the parameters will be omitted.

The packet header suppression rule is set up based on the fields not varying in every packet 501. That is, it means that the header information for setting the packet header suppression rule is predetermined and programmed by a programmer.

For example, the fields not varying in every packet such as an address of transmitter, an address of target and a port number are predetermined programmed and constructed the packet header suppression rule statically by the programmer.

Since, the packet header suppression rule is set up at call setup step, the header of packet transmitted after the call setup can be suppressed.

In IEEE 802.16 standard, the payload header suppression (PHS) method is defined and used for reducing size of the packet header in wireless channel.

In the PHS method, a header is divided into a suppression part and a non-suppression part. First, a transmitter sends the non-suppression part into a receiver by eliminating the suppression part of the header. Then, the receiver restores the eliminated suppression part of the header and forms the entire header.

However, the PHS method of the IEEE 802.16 standard has several problems as described below.

First, in fields of header, there are fields varying in every packet, fields not varying in every packet and fields occasionally varying after call setup. Therefore, the fields occasionally varying after call setup cannot be eliminated based on the PHS method of the IEEE 802.16 standard.

Second, applications such as a media player and a web browser can change an access server in working. Therefore, detecting method of new connection between new access server and the applications is needed.

Third, when the programmer predetermines a programming that the packet header suppression rule is set up by selecting fields of header information not varying in every packet statically, the fields not varying in every packet among the header information still can be exist and it cannot be eliminated perfectly. For example, if the programmer sets the packet header suppression rule based on the IP header information and the UDP header information, fields not varying in every packet of the RTP header information cannot be eliminated in a header, which includes the IP header information, the UDP header information and the RTP header information.

DISCLOSURE

Technical Problem

It is, therefore, an object of the present invention to provide an apparatus for a dynamic header compression and a method thereof which applies a packet header suppression rule to a transmitted packet in a wireless communication system dynamically based on a comparison result between a received packet and a previous packet, different from applying a predetermined packet header suppression rule statically.

It is, therefore, another object of the present invention to provide a packet header suppression rule which used for suppressing and restoring a header of the packet transmitted between a terminal and a base station in an IEEE 802.16 packet-based wideband wireless communication system.

Other objects and advantages of the present invention will be clearly understood by the following description and embodiments. Also, it is obvious to those skilled in the art that the objects and advantages of the present invention can be realized by the means as claimed and combinations thereof.

Technical Solution

In accordance with one aspect of the present invention, there is provided a method for a dynamic header compression, including: receiving a received packet having a header from an upper layer; comparing header information of the received packet with header information of a previous packet; when a suppression part of the received packet is the same as a suppression part of the previous packet, compressing the received packet based on a predetermined header suppression rule; and when the suppression part of the received packet is not the same as the suppression part of the previous packet, transmitting the received packet without compression.

In accordance with another aspect of the present invention, there is provided an apparatus for a dynamic header compression, including: a packet classifier for classifying a received packet based on a predetermined packet classification rule; and a dynamic header compressor for comparing the received packet and a previous packet, determining that a suppression part of the received packet is the same as the suppression part of previous packet, the suppression part of the received packet is greater than the suppression part of previous packet, or the suppression part of the received packet is not the same as the suppression part of previous packet, and suppressing the received packet by applying a packet header suppression rule corresponding to a comparison result.

Advantageous Effects

The present invention can provide an apparatus for dynamic header compression and a method thereof which detects a new connection, compresses a header of packet based on the detected connection and performs header compression by detecting fields of occasionally varying after call setup of the header, different from applying a predetermined packet header suppression rule statically.

Also, the present invention can provide a packet header suppression rule used for dynamically compressing and restoring a header of packet transmitted between a terminal and a base station in an IEEE 802.16 packet-based wideband wireless communication system.

Moreover, the present invention can increase utility efficiency of wireless resources by applying a packet header suppression rule to a transmitted packet between a terminal and a base station in a wireless communication system dynamically based on a comparison result between a received packet and a previous packet, different from applying a predetermined packet header suppression rule statically.

In addition, the present invention can compatible with a packet header suppression rule in an IEEE 802.16 standard and increase a suppression ratio by detecting and compressing occasionally varying header information than a previous static compression method.

In addition, the present invention can be applied to a design and an implementation of the IEEE 802.16 wideband wireless communication system, and increases a efficiency of wireless resources by decreasing a size of the packet header in wireless channel.

Finally, the present invention can compress a header of packet by detecting a new connected packet when an application such as a media player and a web browser dynamically changes an access server.

DESCRIPTION OF DRAWINGS

The above and other objects and features of the present invention will become apparent from the following description of the preferred embodiments given in conjunction with the accompanying drawings, in which.

BEST MODE FOR THE INVENTION

Other objects and aspects of the invention will become apparent from the following description of the embodiments with reference to the accompanying drawings, which is set forth hereinafter.

Figure 6:
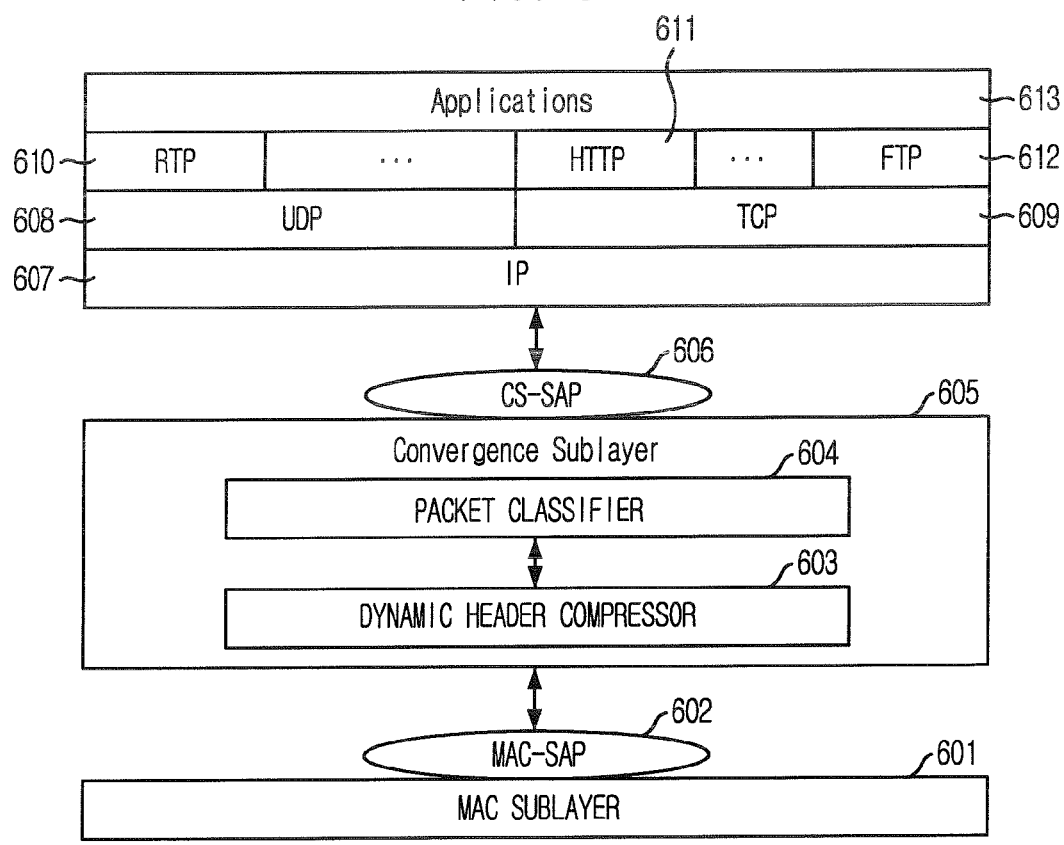
FIG. 6 illustrates a protocol structure of wireless telecommunication network having an apparatus for dynamic header suppression in accordance with an embodiment of the present invention.

FIG. 6 illustrates a protocol structure of wireless telecommunication network having an apparatus for dynamic header suppression in accordance with an embodiment of the present invention.

As shown in FIG. 6, the protocol structure of the present invention will be described from upper layer to lower layer.

A data flows from a multimedia applications layer 613 into lower layers. The data is transmitted into a real-time transport protocol (RTP) layer 610, a hypertext transport protocol (HTTP) layer 611, and file transport protocol (FTP) layer 612 based on kind of the multimedia applications layer. Herein, the multimedia applications layer is considered as a web browser in present invention.

The data from the web browser is transmitted into the HTTP layer 611 and transformed into a data having a HTTP format in the HTTP layer 611.

Then, the data having the HTTP format is transmitted into a transmission control protocol (TCP) layer 609. The TCP layer 609 adds a TCP header to the received data and transmits the TCP header added data into Internet protocol (IP) layer 607.

The IP layer 607 adds an IP header to the received data and transmits the IP header added data into a convergence sublayer (CS) 605 through a convergence sublayer—service access point (CS-SAP) 606.

In the CS 605, a packet classifier 604 classifies the received packet from the upper layer. The classified packet in the packet classifier 604 is transmitted into a dynamic header compressor 603, which is newly defined in accordance with an embodiment of the present invention.

Figure 5:
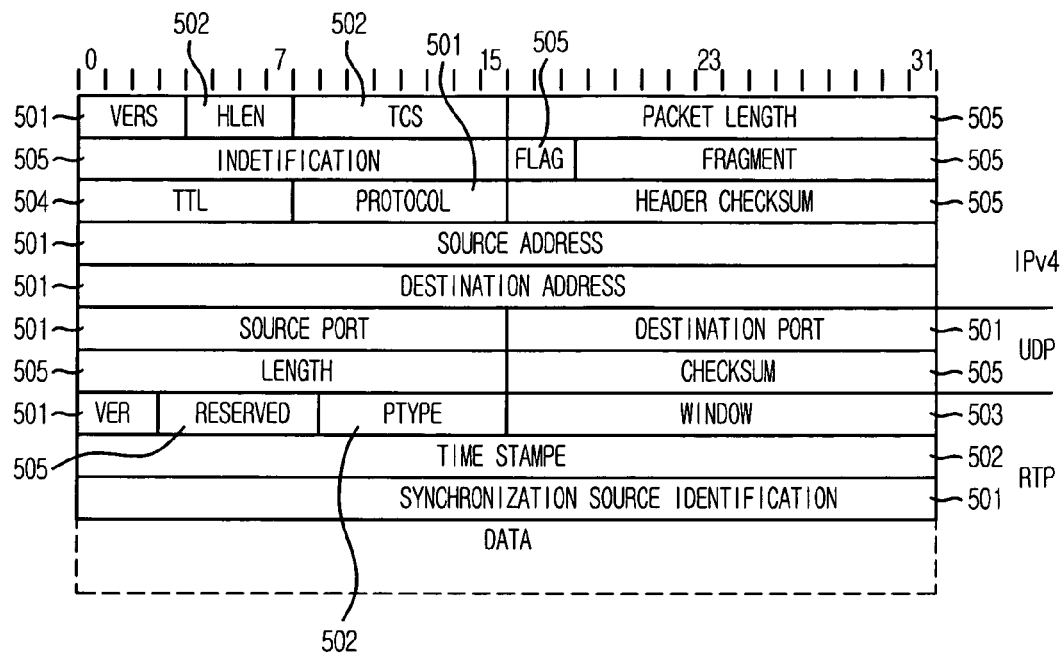
FIG. 5 illustrates an overhead of header information in an IPv4 communication system.

The dynamic header compressor 603 extracts fields occasionally varying after call setup 502 and 503 among header information shown in FIG. 5, sets a new packet header suppression rule and compresses next header of the received packet based on the new packet header suppression rule.

After the header compression of the received packet is completed, the CS 605 maps the compressed packet based on a predetermined flow at the call setup step, adds a connection identifier (CID) and transmits the CID added packet into a media access control (MAC) sub layer 601 through a media access control—service access point (MAC-SAP) 602.

Figure 7:
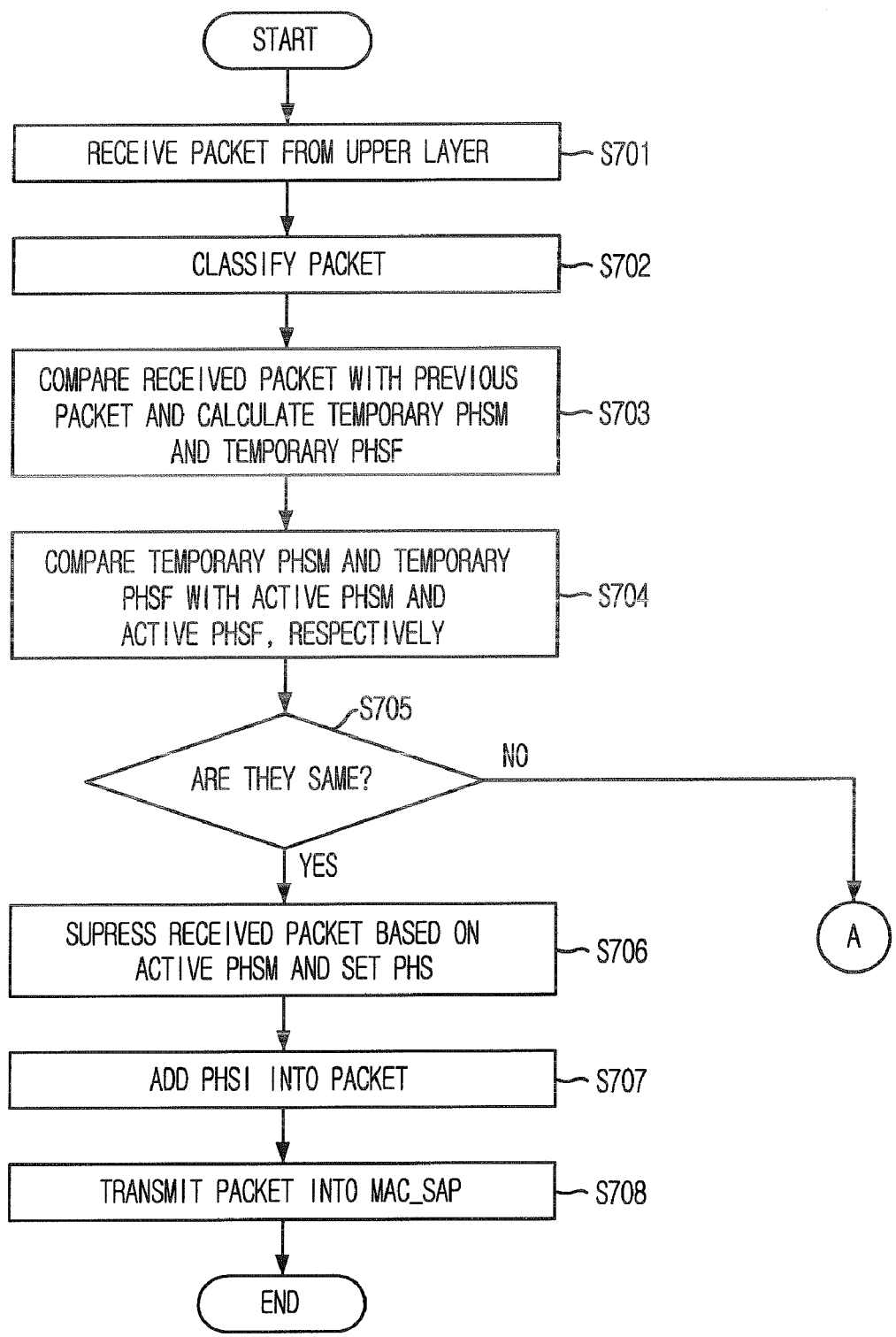
FIGS. 7 and 8 are flowcharts illustrating a method for dynamic header compression in accordance with an embodiment of the present invention.
Figure 8:
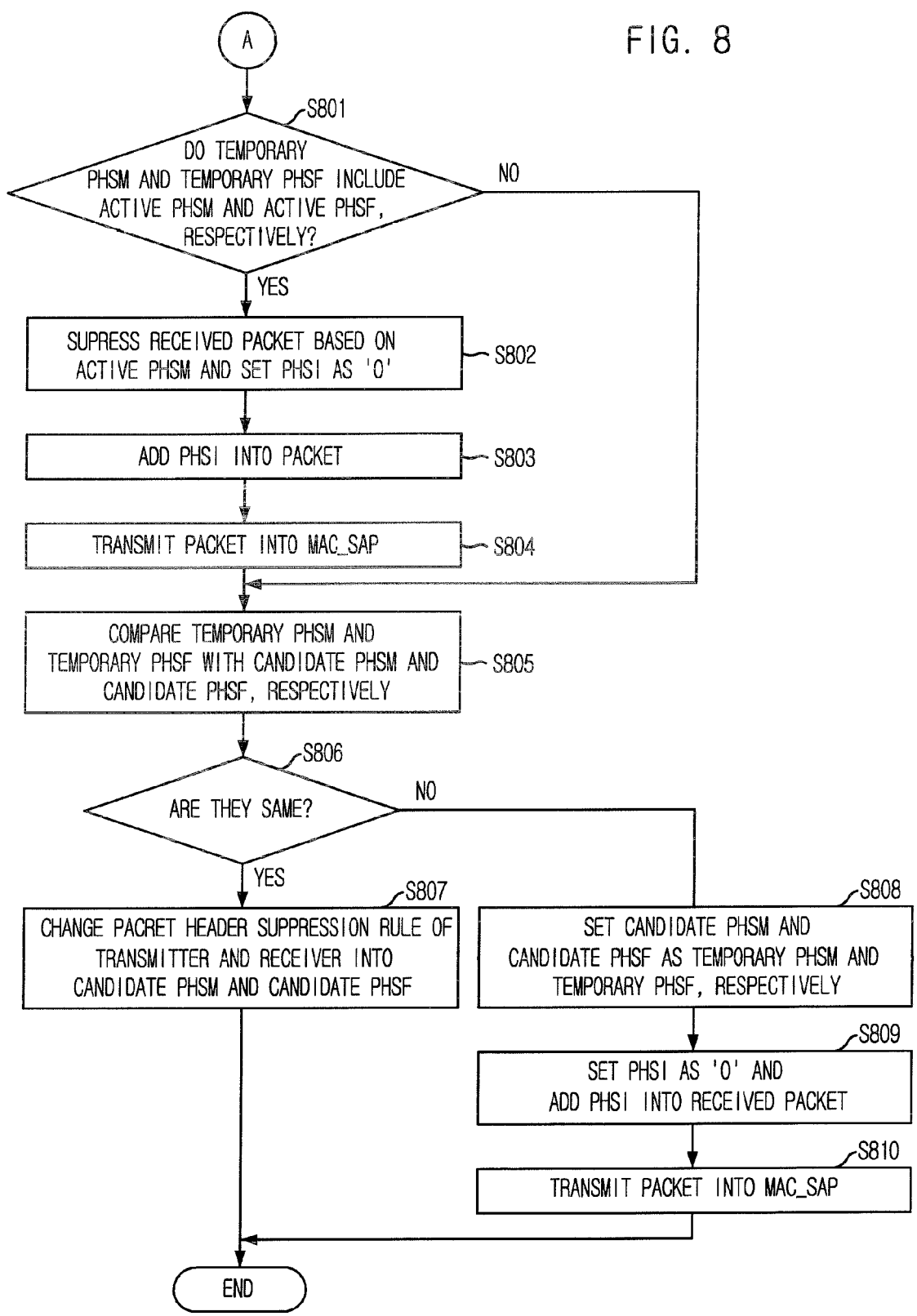
Figure 9:
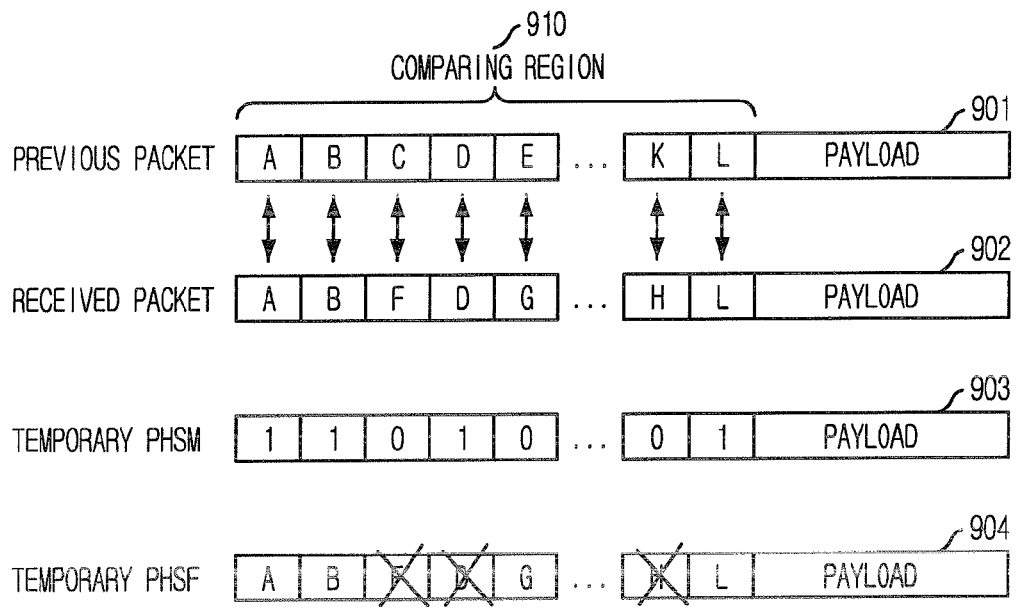
FIG. 9 illustrates a procedure for generating a temporary payload header suppression mask (PHSM) and a temporary payload header suppression field (PHSF) in accordance with an embodiment of the present invention.
Figure 10:
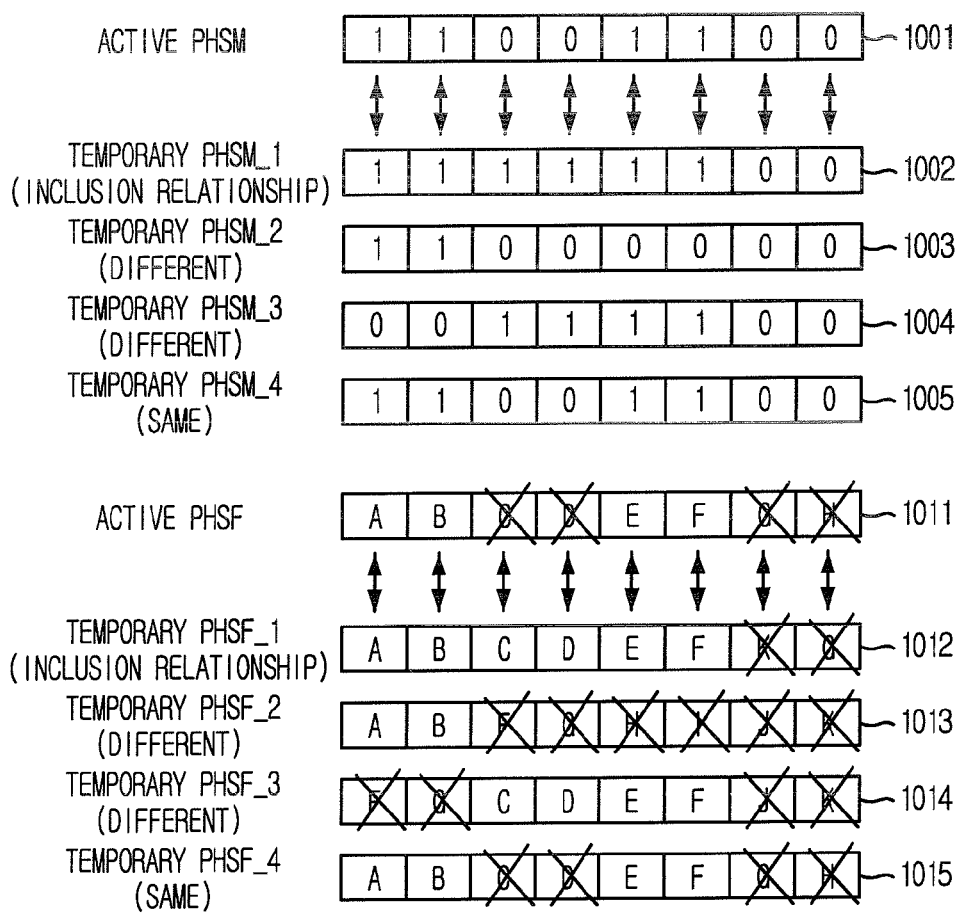
FIG. 10 illustrates a packet verifying based on the temporary PHSM and the temporary PHSF in accordance with an embodiment of the present invention.

FIGS. 7 and 8 are flowcharts illustrating a method for dynamic header compression in accordance with an embodiment of the present invention; FIG. 9 illustrates a procedure for generating a temporary payload header suppression mask (PHSM) and a temporary payload header suppression field (PHSF) in accordance with an embodiment of the present invention; and FIG. 10 illustrates a packet verifying based on the temporary PHSM and the temporary PHSF in accordance with an embodiment of the present invention.

Below, operation of transmitter applying the method for the dynamic header compression in accordance with the present invention will be described referring to FIGS. 7 to 10.

First, when a packet is received from upper layer to the CS 605 through the CS-SAP 606 at step S701, the received packet is classified in the packet classifier 604 at step S702 and the classified packet is transmitted into the dynamic header compressor 603 in the transmitter.

The dynamic header compressor 603 generates the temporary PHSM and the temporary PHSF by comparing header information of the received packet classified in the packet classifier 604 and header information of previous packet at step S703.

Referring to FIG. 9, generating procedure of the temporary PHSM and the temporary PHSF is described in detail.

When the packet is received, the dynamic header compressor 603 generates the temporary PHSM 903 and the temporary PHSF 904 based on the previous packet 901 and the received packet 902. That is, the temporary PHSM 903 and the temporary PHSF 904 are generated by combining the previous packet 901 and the received packet 902.

When the temporary PHSM 903 is '1', corresponding byte is eliminated. The eliminated byte can be restored based on the corresponding temporary PHSF 904.

A comparing region 910 between the previous packet 901 and the received packet 902 for calculating the temporary PHSM 903 and the temporary PHSF 904 can be enlarged or become narrower. For example, parts for compression can be extracted in IP header information having newly added header information.

Referring to FIG. 7, at step S704, the temporary PHSM and the temporary PHSF generated at step S703 are compared with a PHSM and a PHSF applied now, respectively. Herein, the packet header suppression rule applied now is defined as an active header suppression rule. A PHSM, a PHSF, a PHSS, a PHSV and a PHSI of the active header suppression rule are defined as an active PHSM, an active PHSF, an active PHSS, an active PHSV and an active PHSI, respectively.

At step S705, it is determined that whether the temporary PHSM and the temporary PHSF are the same as the active PHSM and the active PHSF, respectively, or not.

If the temporary PHSM and the temporary PHSF are not the same as the active PHSM and the active PHSF, respectively, 'A' state is performed referring to FIG. 8. Otherwise, step S706 is performed.

At step S706, if the temporary PHSM and the temporary PHSF are the same as the active PHSM and the active PHSF, respectively, the transmitter determines that parts for compression are the same in the previous packet and the received packet. In addition, the received packet is compressed based on the active PHSM, and the PHSI is determined as an active PHSI.

Subsequently, the determined PHSI is added into the compressed received packet at step S707, and the PHSI added packet is transmitted into the MAC layer 601 through the MAC-SAP 602 at step S708.

Referring to FIG. 10, a packet verification based on the temporary PHSM and the temporary PHSF in accordance with an embodiment of the present invention will be described in detail.

As shown in FIG. 10, when an active PHSM 1001 and a temporary PHSM_4 1005 are the same, suppression part of the previous packet and the received packet are considered as the same. Likewise, when an active PHSF 1011 and a temporary PHSF_4 1015 are the same, restoration information of the previous packet and the received packet are considered as the same.

Meanwhile, because the active PHSM 1001 is included a temporary PHSM_1 1002, it is considered that suppression part of the received packet is greater than suppression part based on the active PHSM 1001. In connection with (Likewise), because the active PHSF 1011 is included a temporary PHSM_1 1012, it is considered that restoration information of the received packet are increased than restoration information based on the active PHSF 1011.

On the other, since the active PHSM 1001 is not the same as a temporary PHSM_3 1003 and a temporary PHSM_4 1004, it is considered that the received packet cannot be compressed based on the active PHSM 1001 because the suppression part of the received packet is not the same as the suppression part of the previous packet. Likewise, since the active PHSF 1011 is not the same as a temporary PHSF_3 1013 and a temporary PHSF_4 1014, it is considered that the received packet cannot be restored based on the active PHSF 1011.

In FIG. 7, the active PHSM and the active PHSF are not the same as the temporary PHSM and the temporary PHSF, respectively, is considered as different or having inclusion relationship each other. In case of inclusion relationship, the received packet is considered having additional suppression part than the previous packet and compressed based on the active PHSM and the active PHSF, and compressed received packet is transmitted. Subsequently, a new packet header suppression rule is generated based on the temporary PHSM and the temporary PHSF and applied to a next packet. In case of different each other, the received packet is considered as new connection having different suppression part from the previous packet, does not suppressed. Then, a new packet header suppression rule is generated and applied to a next packet. A detailed description will be followed referring to FIG. 8.

As shown in FIG. 8, 'A' state that the active PHSM and the active PHSF are different from the temporary PHSM and the temporary PHSF is initial state, respectively. The transmitter the temporary PHSM and the temporary PHSF are included in the active PHSM and the active PHSF, respectively at step S801.

When the temporary PHSM and the temporary PHSF are included in the active PHSM and the active PHSF, respectively, the received packet is compressed based on the active PHSM and the PHSI is determined as an active PHSI at step S802. Subsequently, determined PHSI is added into the compressed received packet at step S803, the PHSI added packet is transmitted into the MAC layer 601 through the MAC-SAP 602 at step S804 and step S805 is performed.

On the other hand, when the temporary PHSM and the temporary PHSF does not included in the active PHSM and the active PHSF, respectively, step S805 is performed.

At step S805, it is determined that whether the active header suppression rule should be changed or not.

AT step S806, the temporary PHSM and the temporary PHSF are compared with a candidate PHSM and a candidate PHSF, respectively. Herein, the candidate PHSM and the candidate PHSF is the stored parameter of the temporary PHSM and the temporary PHSF, respectively.

At step S806, it is determined that whether the temporary PHSM and the temporary PHSF are the same as the candidate PHSM and the candidate PHSF, respectively, or not.

When the temporary PHSM and the temporary PHSF are the same as the candidate PHSM and the candidate PHSF, respectively, the active header suppression rules of the transmitter and the receiver are changed based on the candidate PHSM and the candidate PHSF at step S807.

Since changing procedures of the PHS method between the transmitter and the receiver are performed based on the IEEE 802.16 standard, detailed description will be omitted in the present invention.

However, when the temporary PHSM and the temporary PHSF are not the same as the candidate PHSM and the candidate PHSF, respectively, the temporary PHSM and the temporary PHSF are stored as the candidate PHSM and the candidate PHSF, respectively at step S808. Then, the received packet is not suppressed and the PHSI is set up as '0' and added into the received packet at step S809.

Subsequently, the PHSI added packet is transmitted into the MAC layer 601 through the MAC-SAP 602 at step S810.

Figure 1:
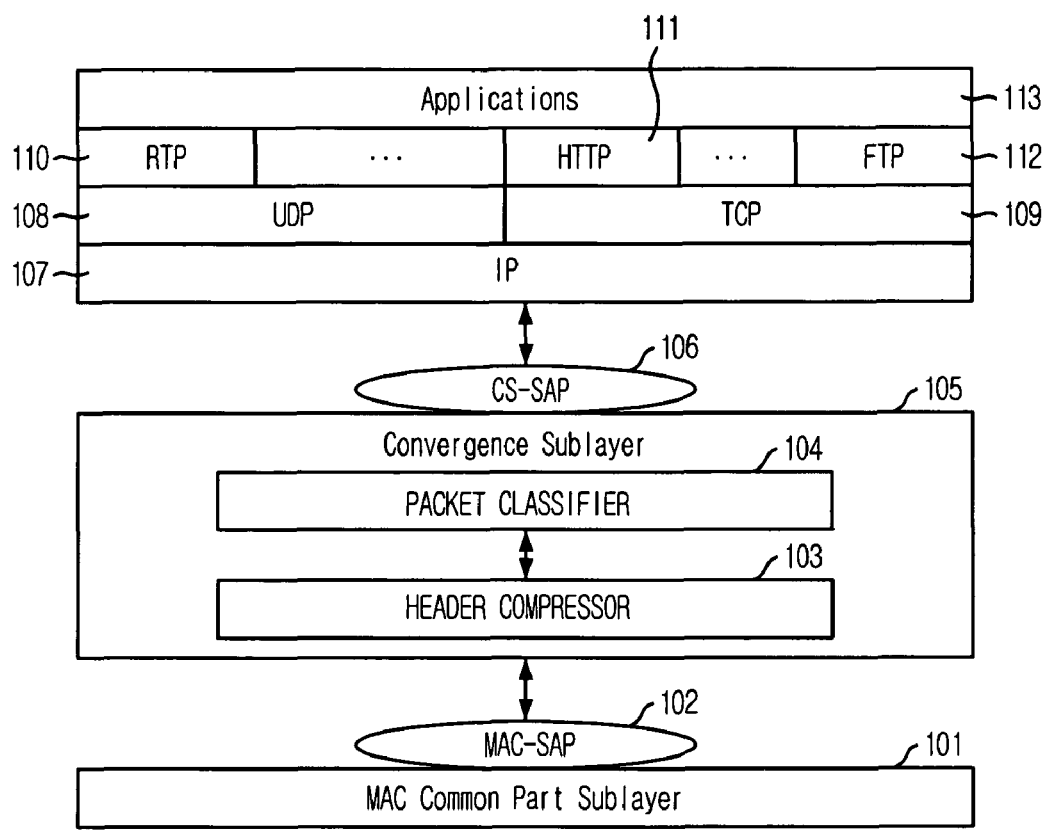
FIG. 1 is a diagram illustrating a protocol structure of wireless telecommunication network providing a packet service based on internet protocol (IP) in an IEEE 802.16 system.
Figure 2:
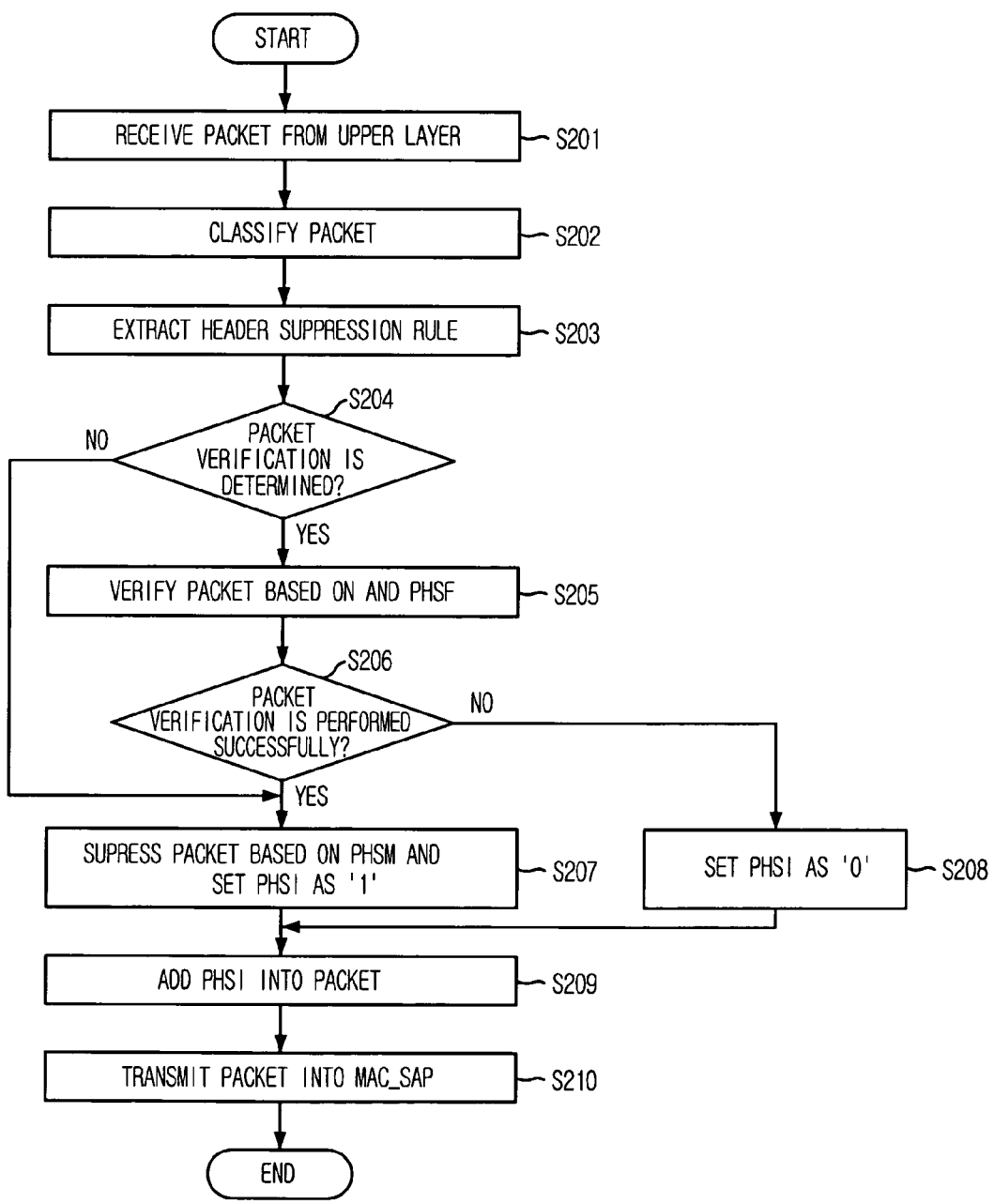
FIG. 2 illustrates a header suppression procedure of a transmitter in the IEEE 802.16 system.
Figure 3:
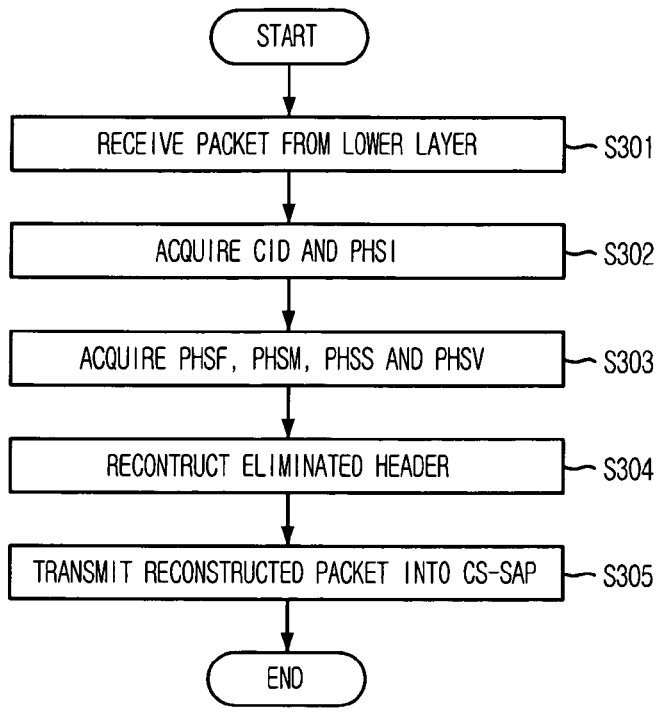
FIG. 3 is a flowchart illustrating a header restoration procedure of a receiver in the IEEE 802.16 system.
Figure 4:
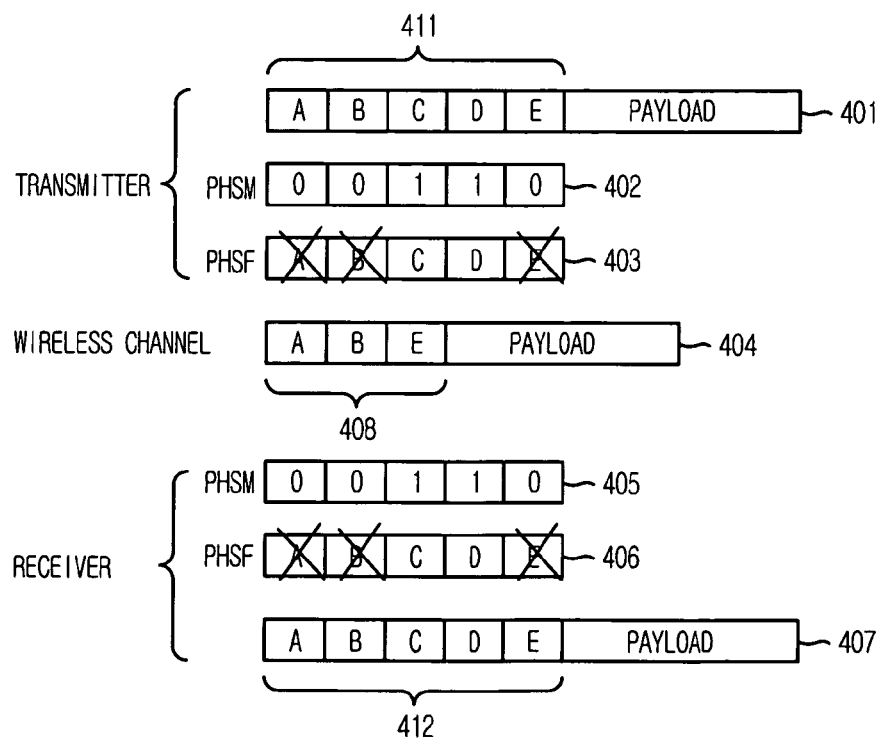
FIG. 4 illustrates header elimination and restoration procedure based on a header suppression techniques in the IEEE 802.16 system.

In the receiver, since restoring step of the header compressed in the dynamic header compressor 603 of the transmitter are the same as the description of FIG. 3, detailed description will be omitted.

That is, in the embodiment of the present invention, the packet header suppression rule between a transmitter and a receiver is changed, not when the suppression part of a received packet is once different from that of the precious packet but when the suppression parts of at least two consecutively received packets are different from that of the previous packet.

The above described method according to the present invention can be embodied as a program and be stored on a computer readable recording medium. The computer readable recording medium is any data storage device that can store data which can be read by the computer system. The computer readable recording medium includes a read-only memory (ROM), a random-access memory (RAM), a CD-ROM, a floppy disk, a hard disk and an optical magnetic disk.

The present application contains subject matter related to Korean patent application No. 2006-0095568, filed with the Korean Intellectual Property Office on Sep. 29, 2006, the entire contents of which is incorporated herein by reference.

While the present invention has been described with respect to certain preferred embodiments, it will be apparent to those skilled in the art that various changes and modifications may be made without departing from the scope of the invention as defined in the following claims.

What is claimed is:

1. A method for a dynamic header compression, comprising:
   receiving a received packet having a header from an upper layer;
   comparing header information of the received packet with header information of a previous packet;
   when a suppression part of the received packet is the same as a suppression part of the previous packet, compressing the received packet based on a predetermined header suppression rule; and
   when the suppression part of the received packet is not the same as the suppression part of the previous packet, transmitting the received packet without compression, wherein the header information of the received packet and the header information of the previous packet can be enlarged or become narrower,
   wherein the comparing header information including:
   calculating a temporary PHSM and a temporary PHSF by comparing the previous packet and the received packet;
   comparing the temporary PHSM and the temporary PHSF with an active PHSM and an active PHSF, respectively;
   when the temporary PHSM and the temporary PHSF are the same as the active PHSM and the active PHSF, respectively, determining the suppression part of the previous packet and the received packet is equal;
   when the temporary PHSM and the temporary PHSF include the active PHSM and the active PHSF, respectively, determining the suppression part of the received packet is greater than the previous packet; and
   when the temporary PHSM and the temporary PHSF are not the same as the active PHSM and the active PHSF, respectively, determining the suppression part of the previous packet and the received packet is different from each other.

2. The method as recited in the claim 1, further comprising, when the received packet has suppression part more than the previous packet, compressing the received packet based on an active header suppression rule and transmitting the compressed packet.

3. The method as recited in the claim 2, wherein said compressing the received packet based on the active header suppression rule includes changing a packet header suppression rule applied to a next received packet.

4. The method as recited in the claim 3, wherein the packet header suppression rule is changed when the suppression parts of at least two consecutively received packets are different from the suppression part of the previous packet.

5. The method as recited in the claim 1, wherein said transmitting the received packet without compression includes changing a packet header suppression rule applied to a next received packet.

6. The method as recited in the claim 5, wherein the packet header suppression rule is changed when the suppression parts of at least two consecutively received packets are different from the suppression part of the previous packet.

7. The method as recited in the claim 1, wherein the packet header suppression rule includes at least any one of PHSM, PHSF, Payload Head Suppression Index (PHSI), Payload Head Suppression Size (PHSS), Payload Head Suppression Verify (PHSV) or combinations thereof.

8. The method as recited in the claim 1, wherein the suppression part of the received packet is dynamically adjusted by varying comparing region between the previous packet and the received packet.

9. A method for a dynamic header compression, comprising:
   receiving a received packet having a header from an upper layer;
   comparing header information of the received packet with header information of a previous packet;
   when a suppression part of the received packet is the same as a suppression part of the previous packet, compressing the received packet based on a predetermined header suppression rule; and
   when the suppression part of the received packet is not the same as the suppression part of the previous packet, transmitting the received packet without compression including changing a packet header suppression rule applied to a next received packet, wherein the changing the packet header suppression rule includes:

storing a first temporary payload header suppression mask (PHSM) And a first temporary payload header suppression field (PHSF) of the received packet as a candidate PHSM and a candidate PHSF, respectively;

comparing a second temporary PHSM and a second temporary PHSF of a next received packet with the candidate PHSM and the candidate PHSF, respectively; and when the second temporary PHSM and the second temporary PHSF of the next received packet are the same as the candidate PHSM and the candidate PHSF, respectively, changing the packet header suppression rule.

10. A method for a dynamic header compression, comprising:

receiving a received packet having a header from an upper layer;

comparing header information of the received packet with header information of a previous packet;

when a suppression part of the received packet is the same as a suppression part of the previous packet, compressing the received packet based on a predetermined header suppression rule;

when the suppression part of the received packet is not the same as the suppression part of the previous packet, transmitting the received packet without compression; and when the received packet has suppression part more than the previous packet, compressing the received packet based on an active header suppression rule and transmitting the compressed packet, wherein the header information of the received packet and the header information of the previous packet can be enlarged or become narrower, wherein said compressing the received packet based on the active header suppression rule includes changing a packet header suppression rule applied to a next received packet.

wherein the changing the packet header suppression rule includes:

storing a first temporary payload header suppression mask (PHSM) And a first temporary payload header suppression field (PHSF) of the received packet as a candidate PHSM and a candidate PHSF, respectively;

comparing a second temporary PHSM and a second temporary PHSF of a next received packet with the candidate PHSM and the candidate PHSF, respectively; and when the second temporary PHSM and the second temporary PHSF of the next received packet are the same as the candidate PHSM and the candidate PHSF, respectively, changing the packet header suppression rule.

* * * * *